(12) United States Patent
Ellis et al.

(10) Patent No.: US 9,399,180 B2
(45) Date of Patent: *Jul. 26, 2016

(54) APPARATUS FOR EXTRACTING OIL FROM OIL-BEARING PLANT MATERIAL

(71) Applicants: Matthew A. Ellis, Englewood, CO (US); Marcus J. Fauth, Denver, CO (US)

(72) Inventors: Matthew A. Ellis, Englewood, CO (US); Marcus J. Fauth, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/470,494

(22) Filed: Aug. 27, 2014

(65) Prior Publication Data

US 2014/0369893 A1 Dec. 18, 2014

Related U.S. Application Data

(63) Continuation-in-part of application No. 13/734,915, filed on Jan. 4, 2013, now abandoned.

(51) Int. Cl.
*B01D 11/02* (2006.01)
*B01D 11/00* (2006.01)
*C11B 1/10* (2006.01)

(52) U.S. Cl.
CPC ............ *B01D 11/0207* (2013.01); *B01D 11/00* (2013.01); *B01D 11/0203* (2013.01); *B01D 11/028* (2013.01); *B01D 11/0292* (2013.01); *C11B 1/10* (2013.01); *B01D 2011/007* (2013.01)

(58) Field of Classification Search
CPC .... C10G 1/04; C10G 1/02; C10G 2300/1011; C10G 2300/1014
USPC .............. 422/119, 274, 281; 202/131; 44/307
See application file for complete search history.

(56) References Cited

U.S. PATENT DOCUMENTS

| | | | |
|---|---|---|---|
| 2003/0077367 A1* | 4/2003 | Trout | ............................. 426/417 |
| 2011/0133120 A1* | 6/2011 | McGhee | ............ B01D 11/0219 252/182.12 |

* cited by examiner

*Primary Examiner* — Lyle Alexander
*Assistant Examiner* — Bryan Kilpatrick
(74) *Attorney, Agent, or Firm* — Keaty Law Firm

(57) ABSTRACT

A system for extracting oil from oil-bearing plant parts has an extraction vessel supported by an upright stand, a separator vessel mounted below the extraction vessel, and an expansion filter vessel mounted downstream from the separator vessel. A source of hydrocarbon solvent supplies liquid gas to the top of the extraction vessel, while a recycling pump connected to the separator vessel facilitates transport of the solvent through the plant material in the extraction vessel. The solvent is recovered and re-circulated, while extracted oil is removed from the separator. A thermal jacket is mounted on each of the separator vessel and the expansion filter vessel; the thermal jackets supplying heat and cold to the interior of the separator vessel and the expansion filter vessel and help evaporate and condense the solvent.

38 Claims, 3 Drawing Sheets

APPARATUS FOR EXTRACTING OIL FROM OIL-BEARING PLANT MATERIAL

CROSS-REFERENCE TO RELATED APPLICATIONS

This application is a continuation-in-part of my application Ser. No. 13/734,915 filed on Jan. 4, 2013 for "An Apparatus for Extracting Oil from Oil-Bearing Plant Material" (abandoned), the full disclosure of which is incorporated by reference herein and priority of which is hereby claimed.

BACKGROUND OF THE INVENTION

This invention relates to an apparatus and method of extracting oil from oil-bearing plant parts, and more particularly, to an apparatus and method of extracting plant oil using a hydrocarbon solvent agent.

Plant oils have been extracted from plant material for centuries. Many plant oils are extracted from seeds by squeezing or crushing the seeds to force out the oil therefrom. Mechanical oil extractors or expellers are extensively used for obtaining cold-pressed oils where the temperature of starting material does not exceed 120° F. In order to increase the oil output, the oil extraction methods provide for the addition of heat and pressure.

In addition, plant oils can be extracted with the assistance of a chemical agent or solvent, such as hexane. Chemical extraction is cheaper and more efficient than mechanical extraction, at a large scale, leaving only 0.5-0.7% of the oil in the plant solids, as compared to 6-14% for mechanical extraction.

Plant seeds and pods are not the only plant components that contain oil. Fibrous plant matter, including leaves, flowers, etc. contain significant amounts of plant oil that can be extracted and used in cosmetics, healthcare industries and the like. Many solutions have been developed to provide plant oil extraction.

For instance, U.S. Pat. No. 5,516,923 discloses a method of plant oil extraction, according to which grounded plant material is deposited into a reactor vessel, and vacuum is created in the reactor vessel. Liquid solvent is introduced into the reactor vessel and allowed to contact the plant material for a time sufficient to dissolve oil from the plant material, while the temperature in the reactor vessel is maintained at a level which prevents denaturing of constituent components of the plant oil and the plant material. Additional solvent vapors are introduced into the bottom of the reactor to cause mixing of the plant material and the solvent and separate fine particulate matter from heavier particles. Pressurized heated solvent vapors are introduced into the top of the reactor vessel while the liquid solvent and oil combination is being removed from the bottom of the reactor vessel through filters. To prevent clogging of filters in the bottom of the reactor vessel pressurized solvent vapors are forced through the filters into the bottom of the reactor vessel. The solvent and oil combination is transferred into a separator vessel, wherein the solvent is vaporized and removed for recycling, while the oil is removed into a holding tank.

U.S. Pat. No. 7,002,029 discloses a process for solvent extraction of oils, in an extraction chamber. According to this method, solvent mist with significant adiabatic cooling is introduced into the extraction chamber, whereby a pressure difference between the solvent inlet and outlet of the extraction chamber drives the solvent mist through the raw oil material. The solvent is fed to the extraction chamber at pressures exceeding atmospheric pressure, and the outlet of the extraction chamber is subject to a partial vacuum.

U.S. application Publication No. 2009/0028971 discloses a method utilizing compressed hydrocarbons. Residues from the crop and fruit treatment, especially from the treatment of pips and berries, are used as starting materials. The method is carried our without organic solvents, while applying low pressures and reduced extraction agent throughputs. Preferred extraction agents are ethane, propane, butane and the mixtures thereof, the extraction itself being carried out in batches at pressures of <50 mPa and temperatures of about 70° C., with an extraction agent throughput of between 4 and 20 kg/kg of starting materials.

U.S. application Publication No. 2011/0133120 teaches a method of plant oil extraction, which provides for a hermetically first tank coupled to a first valve, the first tank for storing a solvent comprising Butane, an extraction zone comprising an extraction chamber coupled between the first valve and a second valve, the extraction chamber having a filter proximate to the second valve; the extraction chamber has a volume between ¼ and ⅙ of the volume of the first tank. A filter separates flowing butane solvent and plant oil from organic plant material in the extraction chamber. A second tank has an exit valve for removing plant oil located on a bottom portion of the second tank, and an exit valve located near a top portion of the second tank.

U.S. application publication No. 2011/0100894 teaches a plant oil extraction device that has a main body member with a hollow interior that receives a plant. A filter member is removably mounted on the main body and has a groove therein that receives glass frit. Thus, when a solvent is placed in the hollow interior with the plant the glass frit filters the plant particulate allowing plant oil and solvent to flow into a receiving vessel. Once the oil is collected the filter member may be removed from the main body such that the glass frit can be cleaned of all plant particulate and be reused.

A commercially available example of an extraction distillation unit is a Tamisium Extractor manufacture by TamiE of Cleburne, Tex. This extractor utilizes several different single solvents, and sometimes co-solvents, a primary solvent and a carrier solvent; in total three distinct types of extractions.

While the methods discussed above may work satisfactory in different environments, there is a need for an easy-to-operate inexpensive apparatus and method of plant oil extraction that can be used in a non-industrial setting by a cosmetics laboratory, small shop and by a consumer without the need to mix solvents during an extraction process.

SUMMARY OF THE INVENTION

It is, therefore, an object of the present invention to provide an apparatus and method of plant oil extraction that is suitable for extracting oil from raw plant material with the assistance of a liquid solvent.

It is another object of the present invention to provide an apparatus and method of plant oil extraction that is suitable for extracting oil from raw plant material in a simple and inexpensive manner.

These and other objects of the invention are achieved through a provision of a system for extracting oil from oil-bearing plant parts that has an extraction vessel supported by an upright stand and a separator vessel mounted below the extraction vessel. A expansion filter is mounted downstream of the separator vessel, filtering the solvent before it is re-circulated in the system. The system uses hydrocarbon solvent for extracting oil from the plant material.

The extraction vessel receives the oil-bearing plant material and liquid solvent causing plant oil to be extracted from biomass loaded into the extractor vessel. The separator assembly operationally connected to the extraction vessel separates the hydrocarbon solvent from oil extracted in the extraction vessel. A separator thermal jacket envelopes the separator vessel and receives heating medium therein, which causes vaporization of the solvent during the plant oil separation process.

The expansion filter vessel is similarly enveloped in a filter thermal jacket, which is configured to receive heated water and heat the contents of the expansion filter vessel. A solvent recovery assembly is operationally connected to the expansion filter assembly and the source of hydrocarbon solvent, the solvent recovery assembly comprising gas recovery/control unit having a re-circulating gas pump and a condenser unit, the gas recovery/control unit being mounted between the expansion filter vessel and the gas tank.

An upright stand supports the extraction vessel, the separator vessel and the expansion filter vessel. The upright stand has a plurality of leveling feet to facilitate positioning of the system in a workshop, laboratory and the like.

BRIEF DESCRIPTION OF THE DRAWINGS

Reference will now be made to the drawings, wherein like parts are designated by like numerals, and wherein.

DETAIL DESCRIPTION OF THE INVENTION

Figure 1:
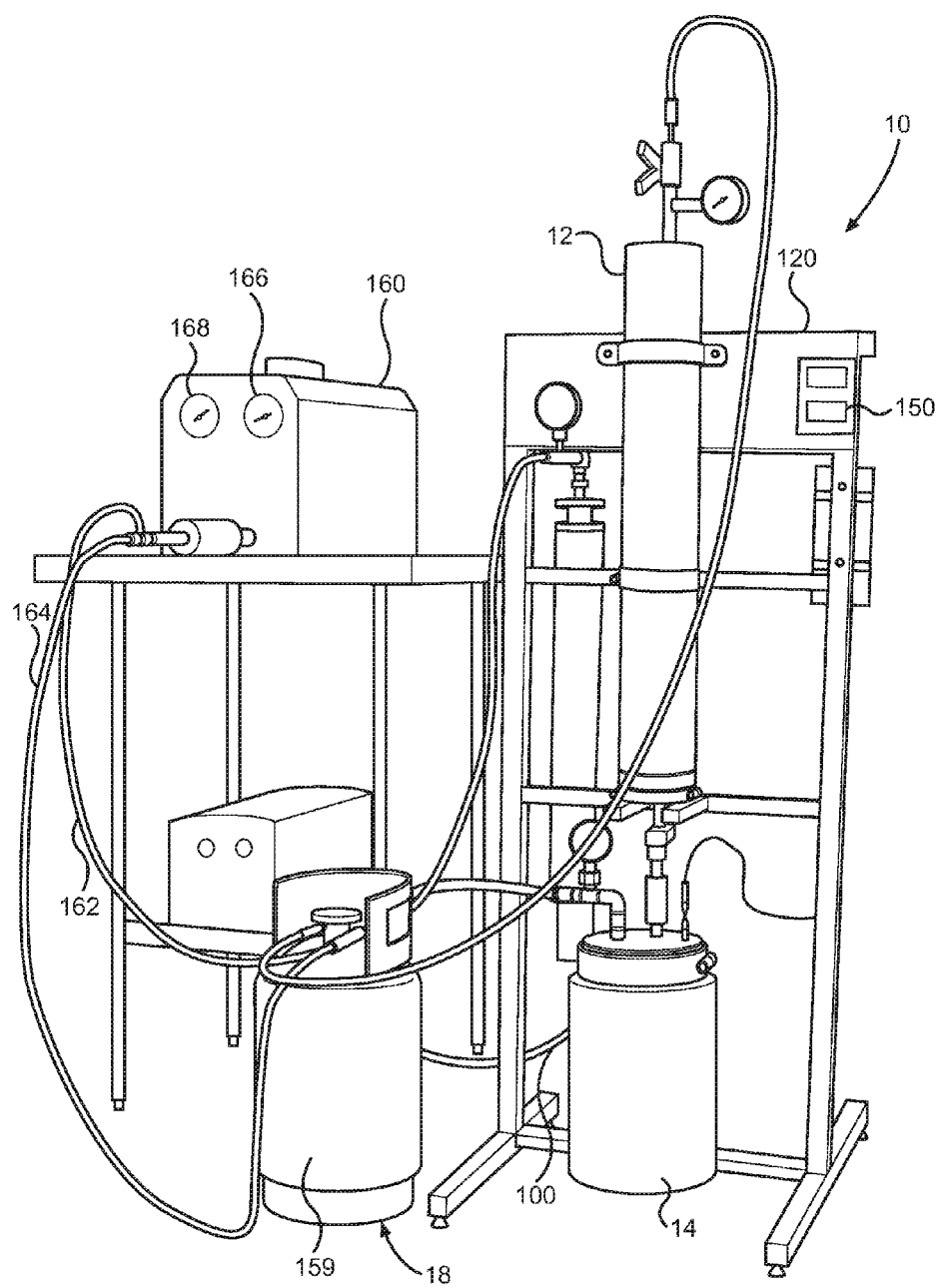
FIG. 1 is a schematic view of the extraction system according to the present invention.
Figure 2:
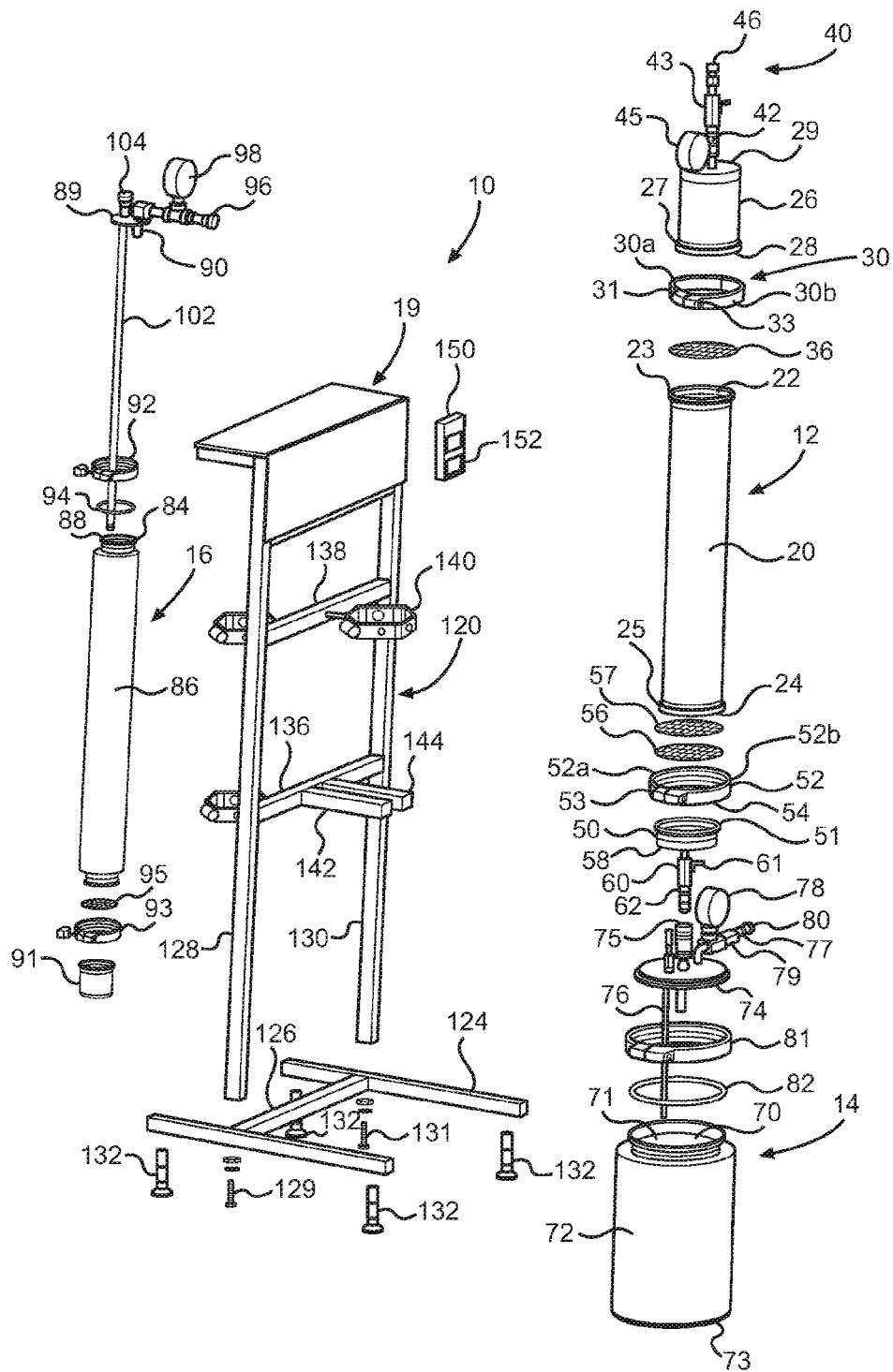
FIG. 2 is an exploded view of the major components of the extraction system according to the present invention.

Turning now to the drawings in more detail, numeral 10 designates the system of plant oil extraction according to this invention. The system 10 comprises an extraction assembly 12, a separator assembly 14, an expansion filter assembly 16, a solvent recovery assembly 18, and an upright support assembly 19, which supports the extraction assembly 12 and the expansion filter assembly 16. If desired, the support assembly 19 can also support the separator assembly 14.

The extraction assembly 12 comprises a tubular hollow extraction vessel 20 having an open top 22 and an open bottom 24. A peripheral flange 23 extends outwardly from the open top 22. A similar peripheral flange 25 extends outwardly from the open bottom 24.

A top cup 26 normally detachably engages with the open top 22. The top cup has an open bottom 28 that matches the size and configuration of the top open end 22 of the extraction vessel 20. The top cup 26 is provided with a peripheral flange 27 that matches the top peripheral flange 23 of the extraction vessel 20. A two-piece top clamp member 30 having clamp members 30a and 30b secures the peripheral flanges 23 and 27 with the help of bolt 31 and nut/washer assembly 33.

A perforated gasket 36 is sandwiched between the bottom of the top cup 26 and the top open end 22 of the extraction vessel 20. The perforated gasket 36 allows the gas to atomize before saturating the biomass or plant material in the extraction vessel 20. The gasket 36 also prevents the biomass from moving upwardly into the top cup 26.

The top cup 26 has a closed top plate 29, which carries a connector assembly 40. The connector assembly 40 comprises operationally connected, an extractor connector conduit 42, a gas inlet valve 43 fitted in the extractor connector conduit 42, and a pressure gauge 45 connected to the gas inlet valve 43. The top of the extractor connector conduit 42 is provided with a quick connect male connector member 46. The inlet valve 43 can be a ball valve.

A bottom cup 50 is detachably secured to the bottom end 24 of the extraction vessel 20. The bottom cup 50 is provided with a matching peripheral flange 51 extending about an open upper edge of the bottom cup 50. The flange 51 of the bottom cup 50 is securable to the bottom peripheral flange 25 of the extraction vessel 20. A hinge clamp assembly 52 having clamp members 52a and 52b secures the flanges 25 and 51 with the bolt 53 and nut/washer assembly 54. In one aspect of the invention, the top cup 26 has longitudinal dimensions at least slightly greater, and preferably twice as great as the longitudinal dimensions of the bottom cup 50, allowing for more head space for the gas of the solvent to move into the extraction vessel 20.

A bottom perforated gasket 56 and a fine screen 57 are sandwiched between the bottom cup 50 and the bottom end 24 of the extraction vessel 20 in order to fine filter the extracted oil. The perforated gaskets 36 and 56 can be made of non-reactive metal, such as for instance stainless steel, and the screen 57 can be a silk screen.

The bottom cup 50 is provided with a bottom plate 58, which closes the bottom of the bottom cup 50. A liquid outlet conduit 60 of the extraction vessel 20 is fitted in the bottom plate 58. An extractor outlet valve 61, which can be a ball valve, is operationally coupled to the liquid outlet conduit 60. A quick-connect connector member 62 is secured to the lower end of the liquid outlet conduit 60.

The separator assembly 14 is mounted below the extraction assembly 20 in fluid communication therewith. The separator assembly 14 comprises a hollow separator or collector vessel 70 enclosed in a separator vessel jacket 72. An annular space is formed between exterior of the separator vessel 70 and interior the separator vessel jacket 72. The annular space can be between 0.5"-1" around the circumference of the separator vessel 70 and the separator vessel jacket. Heated water is circulated in the annular space to heat the separator vessel and speed the conversion of solvent from liquid to gas along the flow line.

The separator vessel has an open top 71 and a closed bottom 73. A separator vessel cap 74 is detachably engageable with the open top 71 of the separator vessel 70. The separator vessel cap 74 sealingly closes the open top 71. The separator vessel cap 74 carries a separator connector conduit 75, which is configured for sealing engagement with the connector member 62 of the bottom cup 50.

A thermal probe member 76 is coupled to the separator vessel cap 74, extending into the interior of the separator vessel 70. A gas outlet conduit 77 is mounted on the separator vessel cap 74 in fluid communication with the separator vessel 70. The gas outlet conduit 77 is provided with a pressure gauge 78 and a gas outlet valve 79. The gas outlet conduit 77 carries a male quick disconnect member 80. The gas outlet conduit 77 is operationally connected to the solvent recovery assembly 18 via a return line 100.

The separator vessel cap 74 is secured to the separator vessel 70 using a tri-clamp 81, which is similar to the clamps 30 and 52 described above. The clamp 81 ensures tight sealing engagement between the periphery of the separator vessel cap 74 and the separator vessel 70. A resilient gasket 82 is sandwiched between the separator vessel cap 74 and the open top of the separator vessel 70 to further ensure a fluid-tight seal therebetween.

The expansion filter assembly 16 comprises a hollow cylindrical expansion filter vessel 84 enclosed in a filter thermal jacket 86, which similarly to the separator vessel jacket 72 is spaced from the wall of the expansion filter vessel 84 by a distance of 0.5" to 1" to allow warm water circulation in the created annular space. An open top 88 of the expansion filter vessel 84 is configured for detachable engagement with a cover plate 89, which carries a filter 90. A tri-clamp 92 secures the cover plate 89 to the open top 88. A flexible gasket 94 ensures a fluid-tight engagement. The filter 90 can be a sintered metal filter. The filter 90 is placed on the outlet side of the expansion filter member to further filter out any impurities or solid material which may be carried by a flow of gas into a recirculation pump 108, as will be described in more detail hereinafter.

A collection cup 91 is detachably secured to the bottom of the expansion filter vessel 84 with the help of a tri-clamp 93. A perforated filter gasket 95 is fitted between the bottom of the expansion filter vessel 84 and the collection cup 91.

A connector conduit 96 connects the expansion filter vessel 84 with the separator vessel 70. A pressure gauge 98 is provided on the connector conduit 96 for measuring gas pressure in the connector conduit 96. An elongated tube 102 is removably inserted in the expansion filter vessel 84 to allow the gas to travel to the bottom of the expansion filter vessel. A quick connect fixture 104 is secured on an upper end of the tube 102 for easy connection to gas supply.

A gas booster pump 108 is operationally connected to the connector conduit 96. The gaseous material exiting the expansion filter member 86 is forced to move to the extractor assembly 12 with the assistance of the gas booster pump 108. A gas bottle or gas tank 159 is mounted between the gas booster pump 108 and the extraction assembly 12.

The support assembly 19 comprises an upright stand 120 having a frame-like structure. A pair of base members 122 and 124 is secured in a spaced-apart parallel relationship by a cross bar 126. The base members 122, 124 are designed to rest on a horizontal surface in a work shop, lab, etc. Upright supports 128 and 130 extend upwardly from the base members 122, 124, respectively, at right angles to the axes of the horizontal base members 122, 124 being secure thereto by bolts 129, 131. A plurality of leveling feet 132 is provided on the bottom of the base members 122, 124 to help maintain the upright support stand 19 on the floor.

Spaced apart parallel cross members 136, 138 extend between the upright members 128 and 130 further ensuring stability of the support assembly 19. The cross member 138 carries a Y-shaped upper yoke 140, which extends horizontally from the cross member 138 transversely to a longitudinal axis of the cross member 138. The yoke 140 is configured to engage the extraction vessel 20 between the clamps 30 and 52 suspending the extraction vessel 20 on the support stand 120.

A pair of bottom support bars 142, 144 is secured in a spaced-apart parallel relationship to each other and attached to the cross member 136. The bottom support bars 142, 144 extend transversely to a longitudinal axis of the cross member 136. The bottom plate 58 of the bottom cup 50 rests on the bottom support bars 142, 144 when the extraction assembly is mounted on the stand 120. As can be seen in FIG. 1, the extractor assembly 14 is suspended from the bottom support bars 142, 144.

The support assembly 19 also supports a temperature monitor unit 150 for the thermal probe 76 of the separator vessel 20. The temperature monitor unit 138 forms a part of the separator assembly 13. The temperature monitor unit 138 is provided with a temperature indicator 152, which allows visual determination of the thermal conditions inside the separator vessel 70.

The solvent recovery assembly 18 comprises a source of solvent (a gas tank 159) and a gas recovery/control unit 160 as well as associated connection hoses, or lines. On the inlet side, the gas recovery/control unit 160 is connected to the gas return line 162; on the outlet side—to the gas tank 159 via a gas conduit 164. The gas recovery/control unit 160 contains a recovery pump having a pressure indicator 166. A condenser is provided in the gas recovery/control unit for condensing gas evacuated from the separator vessel 70. The condenser has a monitor 168 on the face of the gas recovery/control unit 160.

The gas tank 159 contains a hydrocarbon solvent, such propane or butane. The gas tank 159 is operationally connected, on the outlet side, to the manually operated gas inlet valve 43 of the extraction assembly 12 via a liquid gas line 170. Liquid gas (which can be propane) exits the gas tank 159 to act as a solvent for the oil extraction process and re-enters the gas tank 159 as recovered condensed gas.

Figure 3:
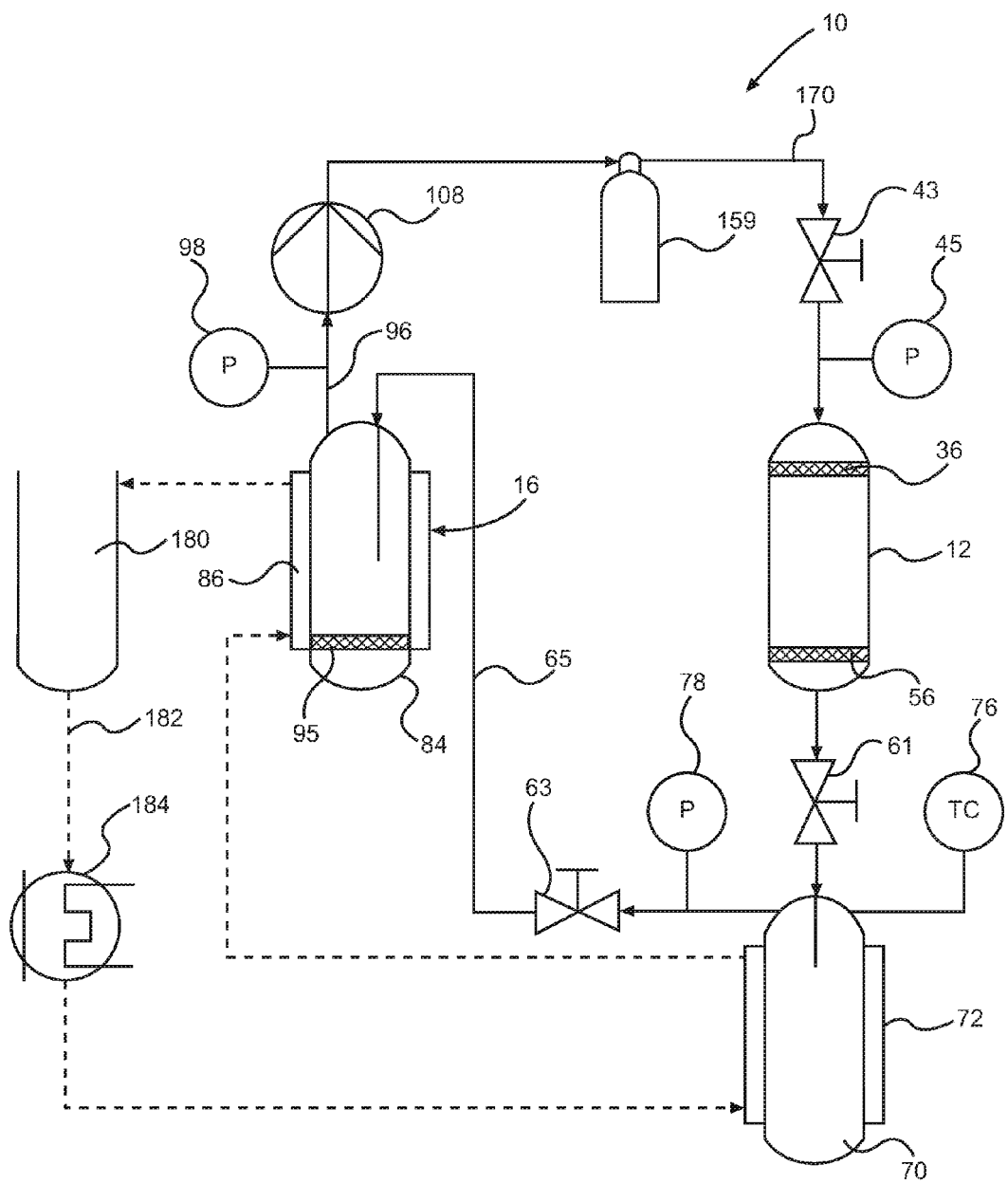
FIG. 3 is a schematic flowchart of the extraction system of the present invention.

In FIG. 3, solid lines designate gas lines and phantom lines designate water lines. In operation, the user removes the high pressure clamp 30 connecting the top cup 26 to the extraction vessel 20. The user then loads the organic plant material into the extraction vessel 20 and reattaches the top cup 26 to the extractor vessel 20 with the high pressure clamp 30. The user then manually opens the gas inlet valve 43 and extractor outlet valve 61. The user also attaches the vacuum hose 162 to the gas inlet valve 43.

A predetermined amount of water from a water reservoir 180 is delivered via a water hose 182 into a water heater/cooler 184. Heated water is then transferred to the jacket 72 of the separator vessel 70 and to the jacket 86 of the expansion filter vessel 84.

Next, the user turns on the recycling pump inside the gas recovery/control unit 160 and allows the gas recovery/control unit it to pull a vacuum on the extractor vessel 20 and the separator vessel 70. Once vacuum has been reached, as evident from monitoring the pressure indicator 166, the valves 43 and 61 are closed. The hose 170 can now be disconnected from the recycling pump and connected to the liquid port on the gas tank 159.

The liquid port on the gas tank 159 is opened, and the gas inlet valve 43 is also slowly opened. This will allow the solvent (propane) from the gas tank 159 to enter the extraction vessel 20. Solvent permeates the plant material or biomass that was deposited into the extraction vessel 20 and removes the desired constituents. The soak time and pressure will vary depending on the solvent used. The solvent remain fluid under pressure contained within the extraction vessel 20 between the valves 43 and 61. When the valve 61 is opened the pressure forces the liquid solvent through the silk screen 57 and the perforated gasket 56 into the separator vessel 70. The pressure gauges should reflect pressure equalizing shortly after the valve 61 is manually opened.

The extract pools at the bottom of the separator vessel 70 and the solvent begins converting into vapor. Applying heat to the water inside the jacket 72 speeds the vaporization process. The valve 63 on the outlet side of the separator assembly 14 is then manually opened, which released pressurized solvent into the expansion filter via the connecting gas line 65.

The top connector conduit 96 on the expansion filter vessel 84 receives solvent from the separator vessel 70. The vaporized gas descends to the bottom of the expansion filter vessel 84, where it is forced through a molecular sieve 95 before being drawn out by the recovery pump 108. The recovery pump 108 ensures that 99% of the gas is recovered, minimizing exposure to flammable solvents.

Pressure on the outlet side of the expansion filter is monitored by the valve 98. Applying heat to the expansion filter vessel 84 via the filter thermal jacket 86 speeds the process.

The solvent vapor exits the expansion filter vessel 84 and is drawn into the inlet side of the recovery pump via a gas line 67. Before entering the recovery pump 108 the vapor passes through a desiccant filter 95 and spot glass 91 connected to the recovery pump inlet. In the system of the present invention, the expansion filter vessel 84 uses a molecular sieve to filter the vaporized gas solvent. The extraction vessel 20 uses pressure to filter the liquid solvent using a silk filter. The separator vessel 70 converts the liquid solvent to pressurized gas, leaving the extract in liquid form.

The scrubbed solvent vapor is drawn into the recovery pump 108 in pulses and stabilized in the internal compressor. The solvent is then released from the discharge side of the recovery pump 108 back into the operating tank 159.

The gas recovery/control unit 96 recovers that gas and pumps it back in to the gas tank or recovery cylinder 159. The thermal probe 76 in the separator vessel 70 is attached to the thermostat 150 allowing the user to monitor the temperature in the separator vessel 70 during this process. Once all of the gas has been removed from the separator vessel 70, the user closes the extractor outlet valve 61. The separator vessel 70 is disconnected from the extractor assembly 12 using the quick disconnect connector below the extractor vessel 20.

Once the separator vessel 70 is detached from the extractor vessel 20, the user can remove the high pressure clamp that is connecting the separator cap 74 to the separator vessel. The extracted oil can now be removed from the separator vessel. The process can then be repeated by loading a new batch of plant material into the extraction vessel 20, forcing the solvent through the plant material and separating the extracted oil from the plant material.

In one aspect of the invention, both the separator vessel 70 and the extraction vessel 20 hold equal amounts of volume. The volume may be between 5 to 10 liters. The separator vessel 70 has a fixed thermal water jacket 90 that allows hot or cold water to be circulated around the separator, when required. In an alternative embodiment, the water heater is replaced with an electric heater. Propane gas can be substituted with other hydrocarbon solvent if desired. A variety of natural organic raw materials can be processed using the apparatus and method of this invention.

Many other changes and modifications can be made in the present invention without departing from the spirit thereof. I, therefore, pray that my rights to the present invention be limited only by the scope of the appended claims.

We claim:

1. An apparatus for extracting oil from oil-bearing plant material, comprising:
a source of hydrocarbon solvent;
an extraction assembly having an extraction vessel receiving the oil-bearing plant material, the extraction assembly comprising an upright extraction vessel and a top cup securable atop the extraction vessel, and wherein a perforated gasket is sandwiched between the extraction vessel and the top cup, the perforated gasket atomizing the solvent for delivery to the oil-bearing plant material in the extraction vessel while preventing the oil-bearing plant material from moving upwardly into the top cup;
a separator assembly operationally connected to the extraction assembly, the separator assembly separating the hydrocarbon solvent from oil extracted in the extraction vessel;
an expansion filter assembly mounted downstream from the separator assembly and configured to filter vaporized hydrocarbon solvent; and
a solvent recovery assembly operationally connected to the expansion filter assembly and to the source of the hydrocarbon solvent, the solvent recovery assembly comprising a gas recovery/control unit having a solvent recycling pump.

2. The apparatus of claim 1, said separator assembly comprising a hollow separator vessel having an open top and a closed bottom, a separator thermal jacket enveloping the separator vessel while defining an annular space between exterior of the separator vessel and interior of the separator thermal jacket, said annular space being configured to receive a heating/cooling medium therein, and a separator vessel cap detachably sealingly engageable with the open top of the separator vessel.

3. The apparatus of claim 2, the separator assembly comprising a temperature monitor unit.

4. The apparatus of claim 3, the separator vessel cap carrying a thermal probe operationally connected to the temperature monitor unit.

5. The apparatus of claim 2, wherein the separator vessel cap carries a gas outlet conduit in fluid communication with interior of the separator vessel, a pressure gauge, and a gas outlet valve operationally connected to the expansion filter assembly.

6. The apparatus of claim 1, the expansion filter assembly comprising a hollow expansion filter vessel and a filter thermal jacket enveloping the expansion filter vessel while defining an annular space between exterior of the expansion filter vessel and interior of the filter thermal jacket, said annular space being configured to receive a heating/cooling medium therein, and where the heating/cooling medium is circulated in the annular space.

7. The apparatus of claim 6, said expansion filter assembly comprising a cover plate detachably engageable with an open top of the expansion filter vessel, said cover plate carrying a filter configured for filtering solid material exiting the expansion filter vessel.

8. The apparatus of claim 7, comprising a clamp member for securing the cover plate to the expansion filter vessel in a fluid-tight engagement.

9. The apparatus of claim 7, wherein the cover plate carries a gas conduit and a pressure gauge mounted in fluid communication with the gas conduit.

10. The apparatus of claim 6, the expansion filter assembly comprising an elongated tube removably inserted in the expansion filter vessel, the tube being configured to direct gas into a bottom of the expansion filter vessel.

11. The apparatus of claim 10, comprising a quick connect fixture secured on an upper end of the tube to allow for easy connection of the tube to a gas supply.

12. The apparatus of claim 6, comprising a collection cup detachably secured to a bottom of the expansion filter vessel.

13. The apparatus of claim 12, comprising a perforated filter gasket fitted between the bottom of the expansion filter vessel and the collection cup.

14. The apparatus of claim 1, comprising a heater unit configured for supplying heated medium to the extraction assembly and the expansion filter assembly.

15. The apparatus of claim 1, the extraction vessel comprises a tubular hollow body having an open top and an open bottom, wherein the top cup is detachably engageable with the open top and wherein a bottom cup is detachably engageable with the open bottom of the extraction vessel.

16. The apparatus of claim 15, wherein the top cup has longitudinal dimensions at least slightly greater than longitudinal dimensions of the bottom cup thereby allowing for more head space for solvent gas to move into the extraction vessel.

17. The apparatus of claim 15, wherein a bottom perforated gasket and a fine filter is sandwiched between the bottom end and the bottom cup of the extraction vessel, the bottom perforated gasket and the fine filter act to fine-filter oil extracted from the oil-bearing plant material.

18. The apparatus of claim 15, wherein the top cup has a top plate closing an upper end of the top cup, the top plate carrying a connector assembly, the connector assembly comprising operationally connected, an extractor connector conduit, a gas inlet valve fitted in the extractor connector conduit, and a pressure gauge connected to the gas inlet valve.

19. The apparatus of claim 18, the connector assembly is mounted in fluid communication between the source of hydrocarbon solvent and the top cup.

20. The apparatus of claim 1, wherein the separator assembly is mounted below the extraction assembly and in fluid communication therewith.

21. The apparatus of claim 1, wherein the gas recovery/control unit has an inlet side connected to the expansion filter assembly and an outlet side connected to a source of hydrocarbon solvent.

22. The apparatus of claim 21, wherein the source of hydrocarbon solvent comprises a gas tank retaining a hydrocarbon solvent, the gas tank being operationally connected, on an outlet side, to an inlet of the extraction assembly.

23. The apparatus of claim 1, comprising an upright stand configured to support the extraction assembly, the separator assembly and the expansion filter assembly.

24. The apparatus of claim 23, the upright stand comprises a pair of horizontal base members configured for positioning on a horizontal surface and secured in a spaced-apart parallel relationship by a first cross bar, a pair of upright supports extending upwardly from the base members, a plurality of spaced apart parallel cross members extending between the upright members, and a plurality of leveling feet detachably securable to the base members.

25. An apparatus for extracting oil from oil-bearing plant material, comprising:
a source of hydrocarbon solvent comprising a gas tank retaining the hydrocarbon solvent;
an extraction assembly having an extraction vessel receiving the oil-bearing plant material, the extraction assembly comprising a tubular hollow extraction vessel having an open top and an open bottom, a top cup detachably engageable with the open top and a bottom cup detachably engageable with the open bottom of the extraction vessel, and wherein a perforated gasket is sandwiched between the extraction vessel and the top cup, the perforated gasket atomizing the solvent for delivery to the oil-bearing plant material in the extraction vessel while preventing the oil-bearing plant material from moving upwardly into the top cup, and wherein a bottom perforated gasket and a fine filter are sandwiched between the bottom end and the bottom cup of the extraction vessel;
a separator assembly operationally connected to the extraction assembly, the separator assembly separating the hydrocarbon solvent from oil extracted in the extraction vessel, the separator assembly comprising a hollow separator vessel having an open top and a closed bottom, a separator thermal jacket enveloping the separator vessel and receiving heating medium therein, and a separator vessel cap detachably sealingly engageable with the open top of the separator vessel;
an expansion filter assembly operationally connected to the separator assembly and positioned downstream of the extraction filter assembly, the expansion filter assembly comprising an expansion filter vessel enveloped in a filter thermal jacket, the filter thermal jacket being configured to receive a heating/cooling medium therein;
an upright stand supporting the extraction vessel, the separator vessel and the expansion filter vessel; and
a solvent recovery assembly operationally connected to the expansion filter assembly and the source of hydrocarbon solvent, the solvent recovery assembly comprising gas recovery/control unit having a re-circulating gas pump and a condenser unit, the gas recovery/control unit being mounted between the expansion filter vessel and the gas tank.

26. The apparatus of claim 25, said expansion filter assembly comprising a cover plate detachably engageable with an open top of the expansion filter vessel, said cover plate carrying a filter configured for filtering solid material exiting the expansion filter vessel.

27. The apparatus of claim 26, comprising a clamp member for securing the cover plate to the expansion filter vessel in a fluid-tight engagement.

28. The apparatus of claim 26, wherein the cover plate carries a gas conduit and a pressure gauge mounted in fluid communication with the gas conduit.

29. The apparatus of claim 25, the expansion filter assembly comprising an elongated tube removably inserted in the expansion filter vessel, the tube being configured to direct gas into a bottom of the expansion filter vessel.

30. The apparatus of claim 29, comprising a quick connect fixture secured on an upper end of the tube to allow for easy connection of the tube to a gas supply.

31. The apparatus of claim 25, comprising a collection cup detachably secured to a bottom of the expansion filter vessel.

32. The apparatus of claim 31, comprising a perforated filter gasket fitted between the bottom of the expansion filter vessel and the collection cup.

33. The apparatus of claim 25, wherein the gas recovery/control unit has an inlet side connected to the expansion filter vessel and an outlet side connected to the gas tank.

34. The apparatus of claim 25, the upright stand comprising a pair of horizontal base members configured for positioning on a horizontal surface and secured in a spaced-apart parallel relationship by a first cross bar, a pair of upright supports extending upwardly from the base members, a plurality of leveling feet detachably engageable with the base members, and a plurality of spaced apart parallel cross members extending between the upright members.

35. The apparatus of claim 25, wherein the top cup has longitudinal dimensions at least slightly greater than longitudinal dimensions of the bottom cup, thereby allowing for more head space for solvent gas to move into the extraction vessel.

36. The apparatus of claim 25, wherein the top cup has a top plate closing an upper end of the top cup, the top plate carrying a connector assembly, the connector assembly comprising operationally connected, an extractor connector conduit, a gas inlet valve fitted in the extractor connector conduit, and a pressure gauge connected to the gas inlet valve, the connector assembly being mounted in fluid communication between the gas tank and the top cup.

37. The apparatus of claim 25, comprising a re-circulating water heater configured to supply heated water to the filter thermal jacket and the separator thermal jacket.

38. The apparatus of claim 25, the separator vessel cap carrying a gas outlet conduit in fluid communication with interior of the separator vessel, a pressure gauge, and a gas outlet valve operationally connected to the expansion filter assembly.

* * * * *